United States Patent
Jiang et al.

(10) Patent No.: US 12,463,720 B2
(45) Date of Patent: Nov. 4, 2025

(54) SYSTEM, APPARATUS, AND METHOD FOR ONLINE DISTRIBUTED POLARIZATION-DEPENDENT LOSS MONITORING

(71) Applicant: HUAWEI TECHNOLOGIES CO., LTD., Guangdong (CN)

(72) Inventors: Zhiping Jiang, Kanata (CA); Xiang Lin, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 294 days.

(21) Appl. No.: 18/139,589

(22) Filed: Apr. 26, 2023

(65) Prior Publication Data

US 2023/0361871 A1 Nov. 9, 2023

Related U.S. Application Data

(60) Provisional application No. 63/339,000, filed on May 6, 2022.

(51) Int. Cl.
*H04B 10/077* (2013.01)
*H04J 14/06* (2006.01)

(52) U.S. Cl.
CPC .......... *H04B 10/0775* (2013.01); *H04J 14/06* (2013.01)

(58) Field of Classification Search
CPC .............................. H04B 10/0775; H04J 14/06
See application file for complete search history.

(56) References Cited

U.S. PATENT DOCUMENTS

| | | | |
|---|---|---|---|
| 2002/0081064 A1* | 6/2002 | Leng | H04B 10/0775 398/79 |
| 2012/0063783 A1* | 3/2012 | Vassilieva | H04J 14/06 398/152 |
| 2018/0123700 A1* | 5/2018 | Li | H04J 14/06 |

(Continued)

OTHER PUBLICATIONS

Kozicki, Bartlomiej & Takara, H. & Inui, Tetsuro & Komukai, Tetsuro & Mori, Kunihiko & Yonenaga, Kazushige. (2011). Monitoring of Orthogonal Polarization Power Ratio due to PDL using Intensity Tones in Polarization Multiplexed Signals. Optics InfoBase Conference Papers. 10.1364/OFC.2011.OWC5. (Year: 2011).*

(Continued)

*Primary Examiner* — Nathan M Cors
(74) *Attorney, Agent, or Firm* — BCF LLP

(57) ABSTRACT

A method for measuring polarization-dependent loss (PDL) of an optical link segment. The method has the steps of: measuring powers of first and second pilot tones (PTs) in a polarization-multiplexed (PM) optical signal at first and second link locations at or about an input and an output end of the optical link segment, respectively, the PM optical signal having first and second optical signals with orthogonal polarizations and amplitude-modulated by the first and second PTs, respectively; calculating a first orthogonal polarization power ratio (OPPR) of the first and second PTs using the powers thereof measured at the first link location; calculating a second OPPR of the first and second PTs using the powers thereof measured at the second link location; and calculating the PDL of the optical link segment based on a comparison between the first and second OPPRs.

7 Claims, 6 Drawing Sheets

(56) References Cited

U.S. PATENT DOCUMENTS

2019/0097721 A1* 3/2019 Li ..................... H04B 10/0795
2021/0399803 A1* 12/2021 Fan ........................ H04J 14/06

OTHER PUBLICATIONS

Girard-Jollet et al., Estimating Network Components Polarization-Dependent Loss Using Performance Statistical Measurements, IEEE, 2021.
Kozicki et al., Monitoring of Orthogonal Polarization Power Ratio due to PDL using Intensity Tones in Polarization Multiplexed Signals, OSA/OFC/NFOEC, 2011.
Zhiping et al., Progresses of Pilot Tone Based Optical Performance Monitoring in Coherent Systems, Journal of Lightwave Technology, DOI 10.1109/JLT.2022.3146232, 2021.

* cited by examiner

SYSTEM, APPARATUS, AND METHOD FOR ONLINE DISTRIBUTED POLARIZATION-DEPENDENT LOSS MONITORING

CROSS-REFERENCE TO RELATED APPLICATIONS

This application claims benefit of priority to U.S. Provisional Patent Application Ser. No. 63/339,000, filed on May 6, 2022 and entitled "SYSTEM, APPARATUS, AND METHOD FOR ONLINE DISTRIBUTED POLARIZATION-DEPENDENT LOSS MONITORING", the contents of which are incorporated herein by reference.

TECHNICAL FIELD

The present disclosure relates generally to an optical transmission system, apparatus, and method, and in particular to an optical transmission system, apparatus, and method for measuring and monitoring the polarization-dependent loss (PDL) of an optical link segment.

BACKGROUND

For ease of understanding, subsection A included at the end of the Detailed Description lists the acronyms and terms used in this disclosure.

Optical transmission systems using polarized lights such as polarization-multiplexed (PM) optical communication systems are known. Generally, such an optical communication system comprises a transmitter (Tx) transmitting a PM data modulated signal through an optical link such as an optical fiber link. A receiver (Rx) receives the PM data modulated signal and detects the signal therefrom. The detected signal may then be further processed for retrieving information therefrom, such as retrieving information transmitted from the transmitter via the signal, detecting an object traversing the transmission path between the transmitter and receiver, and/or the like.

In many optical transmission systems, multiplexing may be used for transmitting a plurality of signals through the same optical link at the same time.

Nearly all optical components of the optical transmission system, such as the wavelength-division multiplexer (MUX), wavelength-division demultiplexer (DEMUX), optical add-drop multiplexer (OADM, which may comprise wavelength-selective switch (WSS), MUX/DEMUX, variable optical attenuators (VOAs), amplifier, and/or the like), optical fibers, and/or the like may introduce polarization-dependent loss (PDL) which is the loss difference caused by different optical signal attenuations with respect to different polarizations of the optical signal and may be defined as the difference between the maximum loss and the minimum loss over all possible state of polarization (SOP) of the optical signal.

In many optical systems using PM optical signals (wherein an optical signal may be polarized to X or Y polarization), PDL is an important or even an essential parameter for characterization of the system and the optical components thereof. Reliable PDL measurement and monitoring is thus important for optical-system design and operation.

There exist methods in literature for monitoring the end-to-end (from Tx to Rx) PDL by using, for example, an Rx digital signal processor (DSP). However, methods are lacking for monitoring the PDL of individual optical components of the optical system.

SUMMARY

The embodiments of the present disclosure have been developed based on developers' appreciation of the limitations associated with the prior art. More particularly, a common phenomenon in optical communication networks is polarization dependent loss (PDL) due to variations in the polarization state of the propagating optical signals in the optical components. The majority of conventional PDL monitoring techniques are processed at the transceiver through digital signal processing. These conventional techniques fail to monitor the PDL of an individual optical link.

With this said, the developers have devised a system and a method for monitoring the PDL in the optical link. Various techniques of the present disclosure rely on pilot tones (PTs) applied to the polarization-multiplexed (PM) optical signals. More particularly, various embodiments of the present disclosure rely on measuring power of the PTs at different locations in the optical link, compute the associated orthogonal polarization power ratios (OPPRs) and computing the PDL based on the associated OPPRs.

According to one aspect of this disclosure, there is provided a method for measuring polarization-dependent loss (PDL) of an optical link segment of an optical transmission system, the method comprising: measuring powers of first and second pilot tones (PTs) in a polarization-multiplexed (PM) optical signal at first and second link locations at or about an input end and an output end of the optical link segment, respectively, the PM optical signal comprising first and second optical signals polarized to orthogonal polarizations and amplitude-modulated by the first and second PTs, respectively; calculating a first orthogonal polarization power ratio (OPPR) of the first and second PTs using the powers of the first and second PTs measured at the first link location of the optical link segment; calculating a second OPPR of the first and second PTs using the powers of the first and second PTs measured at the second link location of the optical link segment; and calculating the PDL of the optical link segment based on a comparison between the first and second OPPRs.

In some embodiments, said measuring the powers of the first and second PTs comprises: synchronously measuring the powers of the first and second PTs in the PM optical signal at the first and second link locations at or about the input end and the output end of the optical link segment, respectively.

In some embodiments, said calculating the PDL of the optical link segment comprises: calculating a difference of the first and second OPPRs; and calculating the PDL of the optical link segment based on a comparison of a maximum and a minimum of the difference of the first and second OPPRs.

In some embodiments, the first and second OPPRs are calculated as:

$$\Delta P_1(t) = 10\log_{10}\frac{P_{1x}(t)}{P_{1y}(t)}$$

$$\Delta P_2(t) = 10\log_{10}\frac{P_{2x}(t)}{P_{2y}(t)}$$

where $\Delta P_1(t)$ and $\Delta P_2(t)$ are the first and second OPPRs, respectively, $P_{1x}(t)$ is the power of the first PT measured at the first link location of the optical link segment, $P_{1y}(t)$ is the power of the second PT measured at the first link location of the optical link segment, $P_{2x}(t)$ is the power of the first PT measured at the second link location of the optical link segment, $P_{2y}(t)$ is the power of the second PT measured at the second link location of the optical link segment, and t represents time; the difference of the first and second OPPRs is calculated as:

$$\Delta P_{21}(t) = \Delta P_1(t) - \Delta P_2(t)$$

where $\Delta P_{21}(t)$ is the difference of the first and second OPPRs; and the PDL of the optical link segment is calculated as:

$$PDL = 0.5 \times (\Delta P_{21}^{max}(t) - \Delta P_{21}^{min}(t))$$

where $P_{21}^{max}(t)$ and $P_{21}^{min}(t)$ are maximum and minimum values of $\Delta P_{21}(t)$.

In some embodiments, said calculating the PDL of the optical link segment comprises: calculating the PDL of the optical link segment based on a comparison of a maximum of the second OPPR and a maximum of the first OPPRs.

In some embodiments, the first and second OPPRs are calculated as:

$$\Delta P_1(t) = 10 \log_{10} \frac{P_{1x}(t)}{P_{1y}(t)}$$

$$\Delta P_2(t) = 10 \log_{10} \frac{P_{2x}(t)}{P_{2y}(t)}$$

where $\Delta P_1(t)$ and $\Delta P_2(t)$ are the first and second OPPRs, respectively, $P_{1x}(t)$ is the power of the first PT measured at the first link location of the optical link segment, $P_{1y}(t)$ is the power of the second PT measured at the first link location of the optical link segment, $P_{2x}(t)$ is the power of the first PT measured at the second link location of the optical link segment, $P_{2y}(t)$ is the power of the second PT measured at the second link location of the optical link segment, and t represents time; and the PDL of the optical link segment is calculated as:

$$PDL = \Delta P_2^{max}(t) - \Delta P_1^{max}(t)$$

where $\Delta P_1^{max}(t)$ and $\Delta P_2^{max}(t)$ are maximum values of $\Delta P_1(t)$ and $\Delta P_2(t)$, respectively.

According to one aspect of this disclosure, there is provided a PDL-measurement system for measuring PDL of an optical link segment of an optical transmission system, the PDL-measurement system comprising: a first PT detector; a second PT detector; and a control circuit coupled to the first and second PT detectors for: controlling the first and second PT detectors to measure powers of first and second PTs in a polarization-multiplexed (PM) optical signal at first and second link locations at or about an input end and an output end of the optical link segment, respectively, the PM optical signal comprising first and second optical signals polarized to orthogonal polarizations and amplitude-modulated by the first and second PTs, respectively, calculating a first OPPR of the first and second PTs using the powers of the first and second PTs measured at the first link location of the optical link segment, calculating a second OPPR of the first and second PTs using the powers of the first and second PTs measured at the second link location of the optical link segment, and calculating the PDL of the optical link segment based on a comparison between the first and second OPPRs.

The method and system disclosed herein allow reliable, efficient, and low-cost measurement of the PDLs of one or more optical link segments of an optical transmission system.

BRIEF DESCRIPTION OF THE DRAWINGS

The features and advantages of the present disclosure will become apparent from the following detailed description, taken in combination with the appended drawings, in which.

Figure 1:
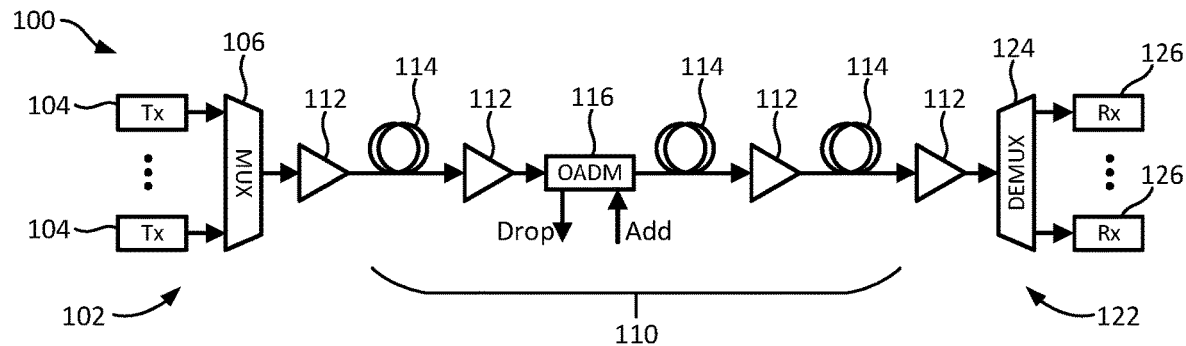
FIG. 1 is a simplified schematic diagram showing an optical transmission system, according to some embodiments of this disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

The instant disclosure is directed to addressing at least some of the deficiencies of the conventional techniques used to mitigate the PDL in the portion of the optical links. In particular, the instant disclosure describes efficient systems and methods for measuring polarization dependent loss (PDL) in optical links.

Unless otherwise defined or indicated by context, all technical and scientific terms used herein have the same meaning as commonly understood by one of ordinary skill in the art to which the described embodiments appertain to.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the processor, nor is their use (by itself) intended to imply that any "second processor" must necessarily exist in any given situation. Further, as is discussed herein in other contexts, reference to a "first" element and a "second" element does not preclude the two elements from being the same actual real-world element. Thus, for example, in some instances, a "first" processor and a "second" processor may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes efficient systems and methods for measuring the PDL in the optical link.

Embodiments disclosed herein relate to distributed polarization-dependent loss (PDL) monitoring methods for monitoring the PDL of an optical link segment between a transmitter (Tx) and a receiver (Rx) of an optical transmission system. In some embodiments, the PDL-monitoring method may be an online method for PDL monitoring during the operation of the system.

Herein, an optical link (or simply a "link") refers to the physical media for transmitting the optical signals between the transmitter and the receiver, and may comprise one or more optical components such as the wavelength-division multiplexer (MUX), wavelength-division demultiplexer (DEMUX), optical add-drop multiplexer (OADM, which may comprise wavelength-selective switch (WSS), MUX/DEMUX, variable optical attenuators (VOAs), amplifier, and/or the like), optical fibers, and/or the like. In the optical transmission system using multiplexing for transmitting a plurality of optical signals of different wavelengths through the link at the same time, the optical link and accordingly the optical components thereof are partitioned into a plurality of wavelength channels each for transmitting an optical signal.

The optical link may also be partitioned into a plurality of optical link segments (or simply "link segments") connected to each other in series. Each optical link segment comprises one or more optical components with an input end for receiving the optical signals and an output end for outputting the optical signals. The PDL of an optical link segment may be measured and monitored by using the PDL-monitoring methods disclosed herein.

In some embodiments, the PDL-monitoring methods use a pilot-tone-based polarization-resolved power-monitoring technique for monitoring the PDL of an optical link segment wherein optical signals with pilot tones applied to different polarizations are transmitted such that their power in each polarization may be measured and monitored for PDL measurement and monitoring.

In some embodiments, amplitude-modulation low-frequency pilot tones (AM-PTs, or simply PTs) are applied to signal's orthogonal polarizations (denoted X and Y polarizations) for monitoring the powers of X and Y polarizations thereof. Then, the orthogonal polarization power ratios (OPPRs) between the X and Y polarizations at two different link locations of the optical link segment at or about the input and output ends thereof are calculated for determining the PDL value thereof.

Turning now the FIG. 1, an optical transmission system in the form of an optical communication system according to some nonlimiting embodiments of this disclosure is depicted and is generally identified using reference numeral 100.

In these embodiments, the optical transmission system 100 is a dense wavelength-division multiplexing (DWDM) optical network. On the transmitting side 102, the DWDM optical network 100 comprises a plurality of transmitters 102 (for example, up to 100 transmitters 104) for generating a plurality of optical signals of different wavelengths. An optical multiplexer or multiplexing component (MUX) 106 (such as a wavelength-division multiplexer) combines or otherwise multiplexes the optical signals generated by the transmitters 102 using wavelength-division multiplexing. The combined optical signal outputted from the MUX 106 is amplified by an amplifier 112 and then transmitted through a link 110 towards the receiving side 122 thereof.

As shown in FIG. 1, the link 110 may comprise a plurality of optical fiber segments 114 for the combined optical signal to transmit therethrough. One or more amplifiers 112 may be used between optical fiber segments 114 for amplifying the transmitted optical signal and compensating for the attenuations the optical signal may experience during transmission. The link 110 may also comprise one or more optical add-drop multiplexer (OADM, which may comprise wavelength-selective switch (WSS), MUX and signal demultiplexer or demultiplexing component (DEMUX), variable optical attenuators (VOAs), amplifier, and/or the like) sites to drop and/or add optical signals (that is, to route some optical signals out of the transmission path or adding and multiplexing new optical signals into the combined optical signal transmitted through the link 110).

On the receiver side 122, the transmitted optical signal is amplified by an amplifier 112 and then demultiplexed by a DEMUX 124 (such as a wavelength-division demultiplexer).

The demultiplexed signals are then processed by a plurality of receivers 126.

The optical components of the DWDM optical network 100, such as the MUX 106, the amplifiers 112, the optical fiber segments 114 such as transmission optical fiber, the OADM 116, and the DEMUX 124, may introduce PDL caused by the change of the optical signal's state of polarization (SOP). In the following, a distributed PDL monitoring method for monitoring an optical link segment (having one or more optical components) of the DWDM optical network 100 is described with an example.

Figure 2:
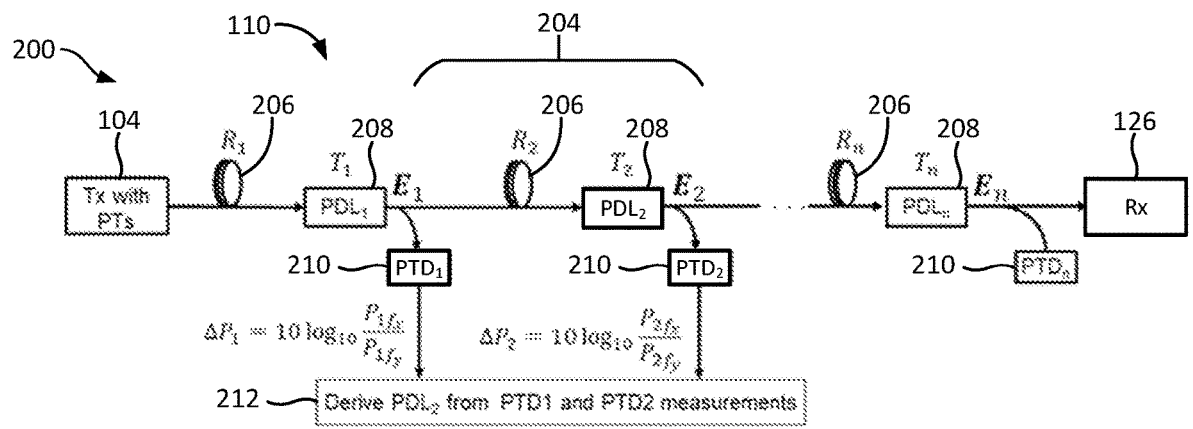
FIG. 2 is a simplified schematic diagram showing the structure for measuring and monitoring the polarization-dependent loss (PDL) of an optical link segment in an optical link between a transmitter and a receiver, according to some embodiments of this disclosure.

FIG. 2 depicts the circuit structure 200 for monitoring PDL of an optical link segment such as the optical link segment 204 of the optical link 110 between a transmitter 104 and a receiver 126. In this example, the optical link 110 comprises n optical link segments (n≥1 is an integer) including the optical link segment 204 to be measured. Each optical link segment has a SOP rotation 206 (also represented as a rotation matrix $R_1, R_2, \ldots,$ or $R_n$) and a PDL 208 (also represented as $PDL_1, PDL_2, \ldots,$ or $PDL_n$). A pair of pilot tone (PT) detectors (PTDs) 210 are coupled to or about the input and output ends of an optical link segment such as the optical link segment 204. A control circuit 212 controls the PTDs 210 for measuring and monitoring the PDL associated with the $PDL_2$ of the optical link segment 204. In some embodiments, the control circuit 212 may be a circuit separated from the PTDs 210; in some other embodiments, the control circuit 212 may be part of the first PTD; and in yet some other embodiments, the control circuit 212 may be part of the second PTD.

Figure 3:
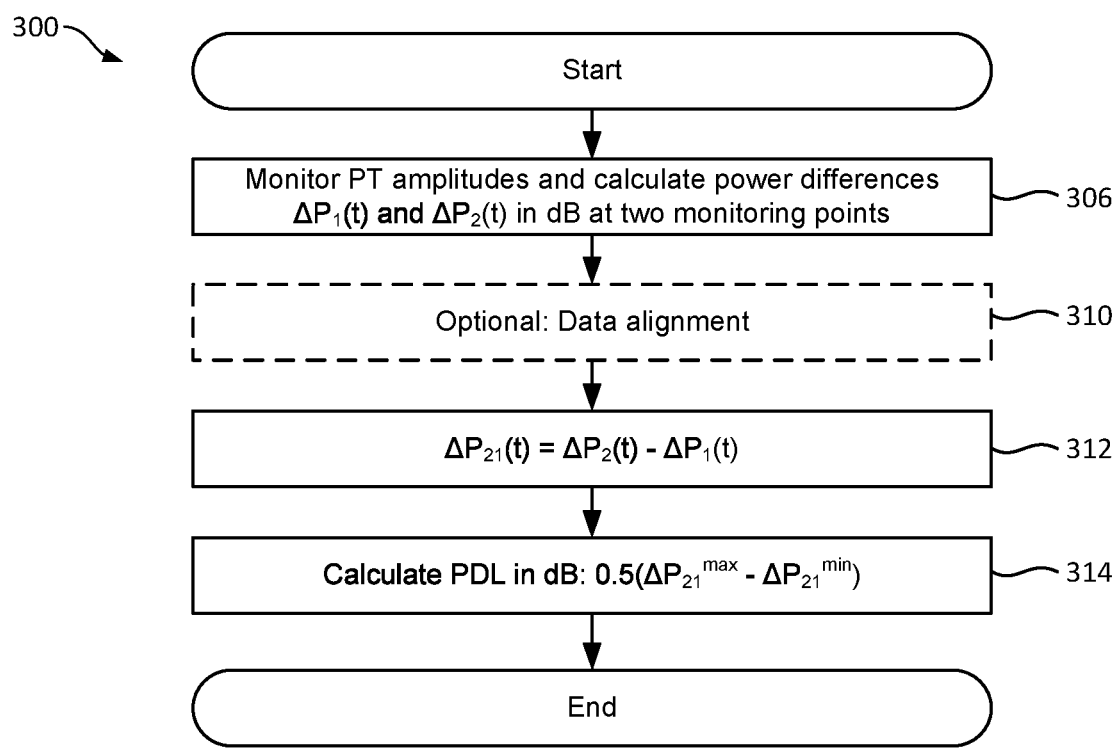
FIG. 3 is a flowchart showing a PDL-measuring process for measuring and monitoring the PDL of the optical link segment shown in FIG. 2, according to some embodiments of this disclosure.

FIG. 3 is a flowchart depicting a PDL-measuring process 300 executed by the control circuit 212 for measuring and monitoring the PDL associated with the $PDL_2$ of the optical link segment 204 using amplitude-modulation low-frequency PTs, according to some embodiments of this disclosure.

Before the process 300 commences, the transmitter 104 first uses a first amplitude-modulation low-frequency PT of frequency $f_x$ to modulate the amplitude of a carrier optical signal's X polarization, and uses a second amplitude-modulation low-frequency PT of frequency $f_y$ to modulate the amplitude of the carrier optical signal's Y polarization. The two modulated carrier optical signal's polarizations are the combined or otherwise polarization-multiplexed by using, for example, a polarization combiner or an optical coupler, and then transmitted through the optical link 110 (and thus through the link segment 204 to be measured).

The PTs may be any suitable amplitude-modulation signal with their frequencies $f_x$ and $f_y$ in a low frequency range such as in the kilohertz (kHz) or megahertz (MHz) range. The carrier optical signals may be any suitable polarized optical signals and may be information-bearing optical signals (for example, information-bearing optical signals used in optical communication systems). The carrier optical signals may have a bandwidth in the gigahertz (GHz) range.

In one nonlimiting example, the PTs may be represented by multiplication factors $1+0.5m \cos 2\pi f_x t$ and $1+0.5m \cos 2\pi f_y t$, where m represents the power modulation index. The carrier optical signals may be represented as $E_{0x}(t)$ with the X polarization and $E_{0y}(t)$ with the Y polarization. Then, the signal with amplitude-modulation (AM) are $E_{0x}(t)(1+0.5m \cos 2\pi f_x t)$ and $E_{0y}(t)(1+0.5m \cos 2\pi f_y t)$, which are then polarization-multiplexed (PM) into a PM AM optical signal for transmitting through the optical link 110.

When the PDL-measuring process 300 is executed by the control circuit 212, at step 306, the PTDs 210 (for example, the PTDs PTD1 and PTD2 shown in FIG. 2) at or about the input and output ends of the link segment 204 substantially synchronously measure the amplitudes (and thus the powers) of the two PTs for a time period T.

For example, each PTD 210 may comprise a light sensor, such as a photodiode, to receive the PM AM optical signal and convert it to an electrical signal. As the received optical signal is amplitude-modulated (meaning that the light power or light intensity thereof varies in accordance with the PT modulation frequencies $f_x$ and $f_y$), the amplitude of the corresponding electrical signal also varies in accordance with the PT modulation frequencies $f_x$ and $f_y$. Thus, the control circuit 212 may readily calculate the powers of the PTs using any suitable methods (for example, by calculating the power spectrum of the electrical signal which exhibits two peaks at frequencies $f_x$ and $f_y$ corresponding to the powers of the two PTs) and without the costly separation of lights of different polarizations from the PM AM optical signal that may otherwise needed.

PTD1 obtains the amplitudes of the two PTs as $P_{1x}(t)$ and $P_{1y}(t)$, and PTD2 obtains the powers of the two PTs as $P_{2x}(t)$ and $P_{2y}(t)$. Since the optical signal's powers are proportional to their associated PT's amplitudes, their powers can be derived by measuring their PT's amplitudes. The orthogonal polarization power ratio (OPPR) in dB of the first and second PTs at PTD1 at time instant t is then obtained as:

$$\Delta P_1(t) = 10\log_{10}\frac{P_{1x}(t)}{P_{1y}(t)} \quad (1)$$

Similarly, the OPPR in dB of the first and second PTs at PTD2 at time instant t is then obtained as:

$$\Delta P_2(t) = 10\log_{10}\frac{P_{2x}(t)}{P_{2y}(t)} \quad (2)$$

Figure 4:
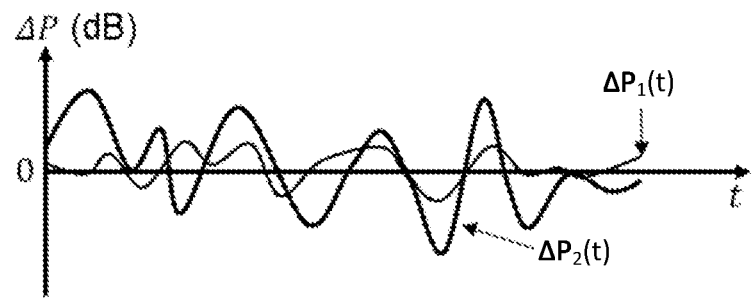
FIG. 4 is a plot showing an example of the orthogonal polarization power ratios (OPPRs) between the X and Y polarizations at two different link locations of the measured optical link segment shown in FIG. 2.

FIG. 4 illustrates an example of $\Delta P_1(t)$ and $\Delta P_2(t)$.

As described above, the SOPs of the optical signals may experience random rotation 206 in the link segment 204. In real optical link, SOP change may be caused by environmental change, such as vibration, pressure, temperature. The SOP-rotation speed may be from as low as sub-Hz to several hundred kHz. After a sufficiently long time period T, the rotation matrix $R_2$ thereof may cover all possible SOPs thereby allowing PDL monitoring, which is similar to that required in conventional PDL measurement.

Thus, after a sufficiently long time of the measurement (for example, when the peaks of $\Delta P_1(t)$ and $\Delta P_2(t)$ are stable, that is, varying within a predefined variation threshold), the obtained $\Delta P_1(t)$ and $\Delta P_2(t)$ may be used for PDL measurement. Various suitable methods may be used for determining T. For example, the control circuit 212 may use a moving window which has a time-length T1 and moves with time, and monitor the maximums of $\Delta P_1(t)$ and $\Delta P_2(t)$. When the maximums of $\Delta P_1(t)$ and $\Delta P_2(t)$ are varying within a predefined variation threshold, the time period T is then reached.

At step 310, data alignment (described in more detail below) may be used to align the obtained $\Delta P_1(t)$ and $\Delta P_2(t)$.

At step 312, the difference between $\Delta P_1(t)$ and $\Delta P_2(t)$ is calculated as:

$$\Delta P_{21}(t) = \Delta P_1(t) - \Delta P_2(t) \quad (3)$$

Figure 5A:
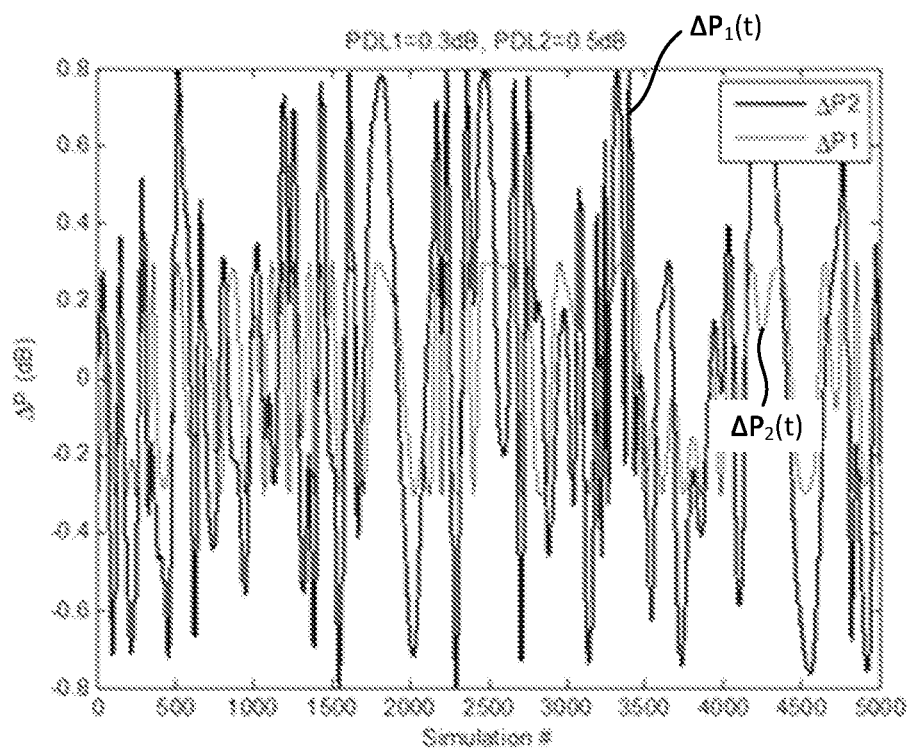
FIG. 5A is a plot showing the simulation results of two cascaded PDL elements under random changes of states of polarization (SOPs)
Figure 5B:
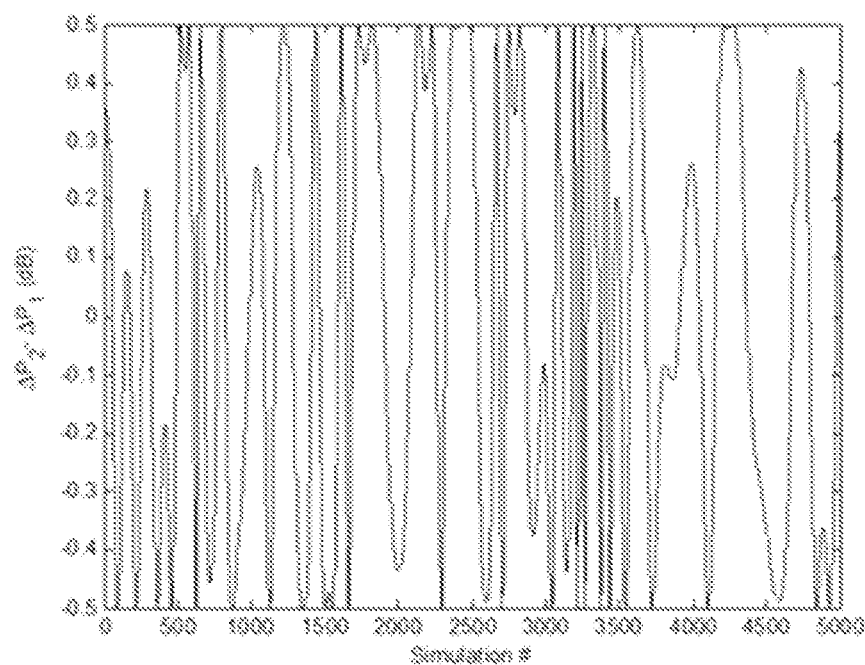
FIG. 5B is a plot showing the difference of the two cascaded PDL elements shown in FIG. 5A.

Then, at step 314, the PDL value PDL2 of the link segment 204 is calculated as:

$$PDL_2 = 0.5 \times (\Delta P_{21}^{max}(t) - \Delta P_{21}^{min}(t)) \quad (4)$$

where $P_{21}^{max}(t)$ and $P_{21}^{min}(t)$ are the maximum and minimum values of $\Delta P_{21}(t)$, for example, within the range of $0 \leq t \leq T$. FIGS. 5A and 5B illustrate the simulation results of two cascaded PDL elements PDL1 and PDL2 under random changes of SOPs, wherein the PDL values are 0.3 dB for PDL1 and 0.5 dB for PDL2, respectively. As shown in FIG. 5A, $\Delta P_1(t)$ changes randomly between −0.3 dB and +0.3 dB, and $\Delta P_2(t)$ changes randomly between −0.8 dB and +0.8 dB. As shown in FIG. 5B, the difference $\Delta P_{21}(t)$ changes between −0.5 dB and +0.5 dB.

Figure 6:
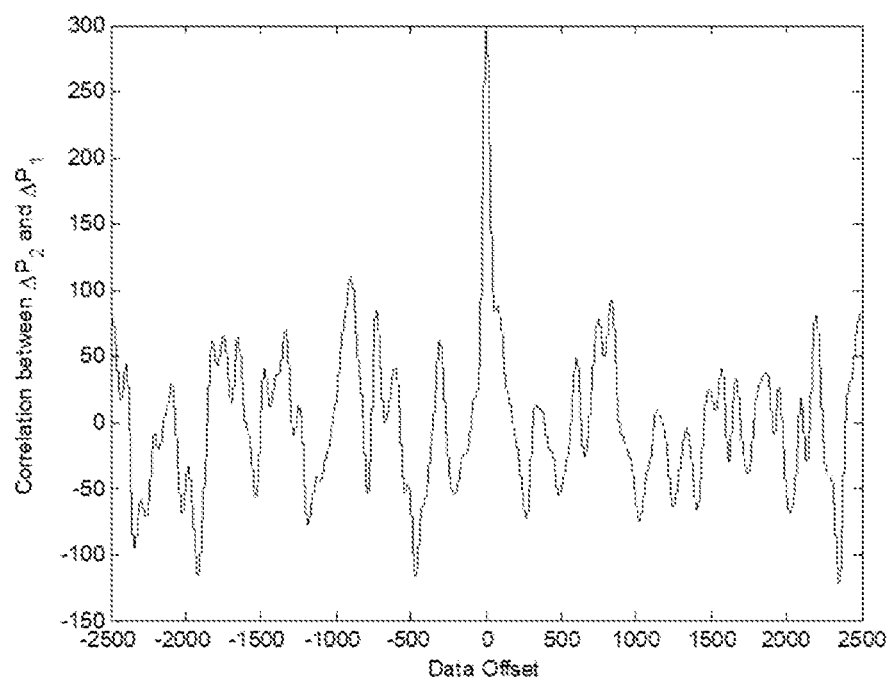
FIG. 6 is a plot showing the cross-correlation of the OPPRs between the X and Y polarizations at two different link locations of the optical link segment shown in FIG. 2 at or about the input and output ends thereof.

As described above, the OPPRs $\Delta P_1(t)$ and $\Delta P_2(t)$ which are substantially synchronously measured and monitored at two different link locations of the optical link segment at or about the input and output ends thereof, may be time-synchronized (if not already time-synchronized) for correctly calculating the PDL value of the link segment 204. In various embodiments, any suitable time-synchronization methods may be used. For example, in some embodiments, the IEEE 1588 precision time protocol (PTP), which is a packet-based two-way communications protocol for synchronizing distributed clocks in an Ethernet or IP-based network, may be used for time-synchronizing the OPPRs $\Delta P_1(t)$ and $\Delta P_2(t)$. In some other embodiments, the cross-correlation of the OPPRs $\Delta P_1(t)$ and $\Delta P_2(t)$ may be calculated and the peak location of the cross-correlation thereof indicates the timing offset (see FIG. 6) which may be used for time-synchronizing the OPPRs $\Delta P_1(t)$ and $\Delta P_2(t)$.

In above embodiments, the PDL-monitoring method 300 is used in the DWDM system where a plurality of optical signals are multiplexed and the link 110 is partitioned into a plurality of wavelength channels. In some alternative embodiments, the PDL-monitoring method 300 may be used in single-channel optical transmission systems 100 that do not multiplex optical signals wherein the link 110 only comprises a single channel for optical signal transmission.

In above examples, the powers of the first and second PTs are measured in dB. In some alternative embodiments, the powers of the first and second PTs may be measured in other suitable units.

In above embodiments, the PDL value PDL2 of the link segment 204 is calculated as:

$$PDL_2 = 0.5 \times (\Delta P_{21}^{max}(t) - \Delta P_{21}^{min}(t)). \quad (5)$$

In other embodiments, the PDL value may be determined based on other comparison of the OPPRs $\Delta P_1(t)$ and $\Delta P_2(t)$. For example, in some alternative, the PDL value may be calculated as:

$$PDL_2 = \Delta P_2^{max}(t) - \Delta P_1^{max}(t) \quad (6)$$

where $\Delta P_1^{max}(t)$ and $\Delta P_2^{max}(t)$ are the maximum values of $\Delta P_1(t)$ and $\Delta P_2(t)$, respectively, for example, within the range of $0 \leq t \leq T$.

Figure 7:
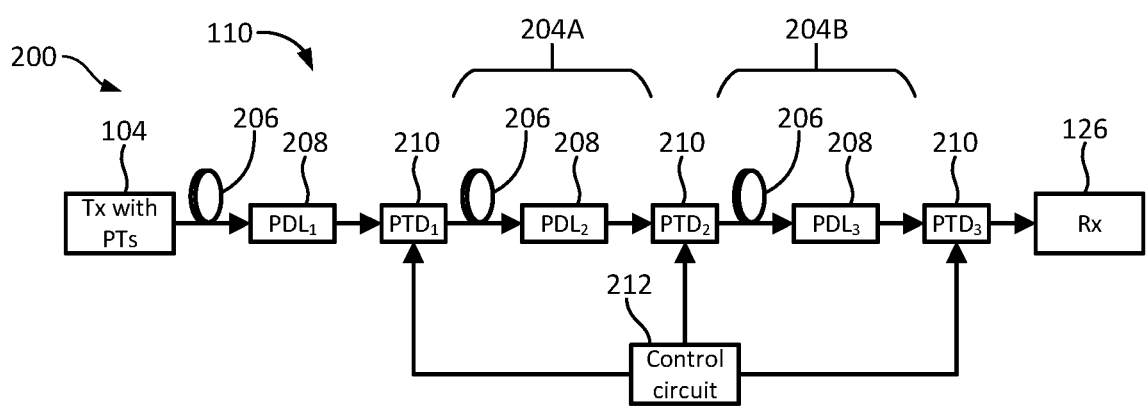
FIG. 7 is a simplified schematic diagram showing the structure for measuring and monitoring the polarization-dependent loss (PDL) of an optical link segment in an optical link between a transmitter and a receiver, according to some embodiments of this disclosure.

Those skilled in the art will appreciate that, in some embodiments, more than two PTDs 120 may be deployed along the optical link 110 for measuring the PDLs of a plurality of optical link segments. For example, in the embodiments shown in FIG. 7, three PTDs 120 may be deployed along the optical link 110 with each adjacent pair of PTDs 120 sandwiching an optical link segment 204. The powers of the PTs measured by the adjacent PTDs PTD1 and PTD2 may be used for measuring the PDL of the optical segment 204A therebetween, the powers of the PTs measured by the adjacent PTDs PTD2 and PTD3 may be used for measuring the PDL of the optical segment 204B therebetween, and the powers of the PTs measured by the PTDs PTD1 and PTD3 may be used for measuring the PDL of the combined optical segment of 204A and 204B.

In some embodiments, a plurality of PTDs 120 may be permanently deployed along the optical link 110 between various optical components to allow users to measure and monitor various optical link segments (defined by any two PTDs of the plurality of PTDs 120) continuously, periodically, and/or as needed.

Thus, the method and system disclosed herein allow reliable, efficient, and low-cost measurement of the PDLs of one or more optical link segments of an optical transmission system.

Figure 8:
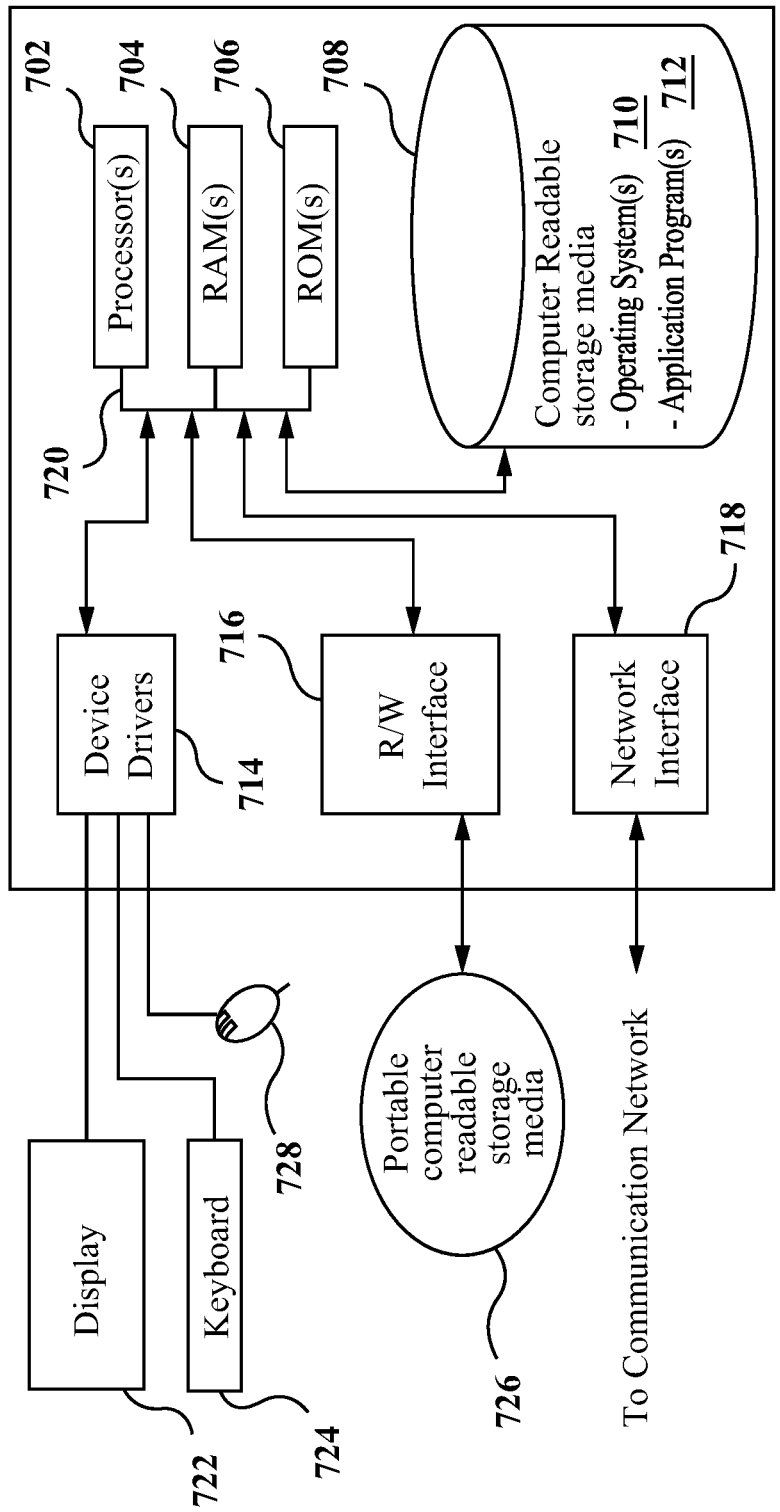
FIG. 8 depicts a high-level block diagram of components of the control circuit, according to some embodiments of this disclosure.

FIG. 8 depicts a high-level block diagram of exemplary components of the control circuit 212, in accordance with various embodiments of the present disclosure. It should be appreciated that FIG. 8 provides only an illustration of one implementation of control circuit 212 and does not imply any limitations with regard to the environments in which different embodiments may be implemented. Many modifications to the depicted environment can be done to implement control circuit 212 without departing from the principles presented herein. The control circuit 212 may be a server, a desktop computer, a laptop computer, or any device that may be configured to implement the present technology, as should be understood by a person skilled in the art.

As shown, control circuit 212 employs one or more processors 702, one or more computer-readable random access memories (RAMs) 704, one or more computer-readable read only memories (ROMs) 706, one or more computer-readable storage media 708, device drivers 714, a read/write (R/W) driver interface 716, a network interface 718, all interconnected over a communication fabric 720. The communication fabric 720 may be implemented by any architecture designed for passing data and/or control information between processors (such as microprocessors, communications and network processors, etc.), system memory, peripheral devices, and any other hardware components within a system.

One or more operating systems 710 and one or more application programs 712 are stored on one or more of computer-readable storage media 708 for execution by one or more of the processors 702 via one or more of respective RAMs 704 (which typically include a cache memory). In the illustrated embodiment, each of the computer-readable storage media 708 maybe a magnetic disc storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The R/W driver interface 716 reads from and writes to one or more portable computer-readable storage media 726. The application programs 712 may be stored on one or more of portable computer-readable storage media 726, read via the respective R/W driver interface 716 and loaded into the respective computer-readable storage media 708.

Further, network interface 718 may be based on a TCP/IP adapter card or wireless communication adapter (such as a 4G wireless communication adapter using OFDMA technology). The application programs 712 on the control circuit 212 may be downloaded to the control circuit 212 from an external computer or external storage device via a communication network (for example, the Internet, a local area network or other wide area network or wireless network) and network interface 718. From network interface 718, application programs 712 may be loaded onto the computer-readable storage media 708. The control circuit 212 may connect to routers, firewalls, switches, gateway computers and/or edge servers of the communication network using copper wires, optical fibers, wireless transmission, and the like.

The control circuit 212 may also include a display screen 722, a keyboard or keypad 724, and a computer mouse or touchpad 728. The device drivers 714 may interface with display screen 722 for imaging, with the keyboard or the keypad 724, with computer mouse or touchpad 728, and/or with display screen 722 (which may be a touch sensitive display) for alphanumeric character entry and user selections. The device drivers 714, R/W driver interface 716 and network interface 718 may comprise hardware and software (stored on the computer-readable storage media 708 and/or the ROM 706).

It is to be understood that the operations and functionality of the control circuit 212, constituent components, and associated processes may be achieved by any one or more of hardware-based, software-based, and firmware-based elements. Such operational alternatives do not, in any way, limit the scope of the present disclosure.

A. ACRONYM KEY

Demux De-Multiplexer
DWDM Dense Wavelength Division Multiplexing
DSP Digital Signal Processor
Mux Multiplexer
OADM Optical Add/Drop Multiplexing
PT Pilot tone
PDL Polarization-Dependent Loss
Rx Receiver
SOP State of Polarization
WSS Wavelength Selective Switch It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for measuring polarization-dependent loss (PDL) of an optical link segment of an optical transmission system, the method comprising:
   measuring powers of first and second pilot tones (PTs) in a polarization-multiplexed (PM) optical signal, the PM optical signal comprising first and second optical signals polarized to orthogonal polarizations and amplitude-modulated by the first and second PTs, respectively,
   measuring the powers comprising:
      measuring a first power $P_{1x}(t)$ of the first PT for a period of time T at a first link location at or about an input end of the optical link segment, t representing a given time during the period of time T;

measuring a second power $P_{1y}$ (t) of the second PT for the period of time T at the first link location;

measuring a third power $P_{2x}$ (t) of the first PT for the period of time T at a second link location at or about an output end of the optical link segment;

measuring a fourth power $P_{2y}$ (t) of the second PT for the period of time T at the second link location;

calculating a first orthogonal polarization power ratio (OPPR) based on the first and second powers measured at the first link location, the first OPPR $\Delta P_1$ (t) being calculated as:

$$\Delta P_1(t) = 10\log_{10}\frac{P_{1x}(t)}{P_{1y}(t)};$$

calculating a second OPPR based on the first and second powers of the first and second PTs-measured at the second link location, the second OPPR $\Delta P_2$ (t) being calculated as:

$$\Delta P_2(t) = 10\log_{10}\frac{P_{2x}(t)}{P_{2y}(t)};$$

calculating a difference function of the first OPPR and the second OPPR over the period of time T, the difference being calculated as:

$\Delta P_{21}(t) = \Delta P_1(t) - \Delta P_2(t)$; and calculating the PDL of the optical link segment based on the difference function of the first and second OPPRs, the PDL being calculated as:

$PDL = 0.5 \times (\Delta P_{21}^{max}(t) - \Delta P_{21}^{min}(t))$, where $P_{21}^{max}$ (t) and $P_{21}^{min}$ (t) are maximum and minimum values of $\Delta P_{21}$ (t).

2. The method of claim 1, wherein said measuring the powers of the first and second PTs comprises:
synchronously measuring the first, second, third, and fourth powers.

3. A PDL-measurement system for measuring PDL of an optical link segment of an optical transmission system, the PDL-measurement system comprising:
a first PT detector;
a second PT detector; and
a control circuit coupled to the first and second PT detectors for:
controlling the first and second PT detectors to measure powers of first and second PTs in a polarization-multiplexed (PM) optical signal at first and second link locations at or about an input end and an output end of the optical link segment, respectively, over a period of time T, the PM optical signal comprising first and second optical signals polarized to orthogonal polarizations and amplitude-modulated by the first and second PTs, respectively,
calculating a first OPPR of the first and second PTs using the powers of the first and second PTs measured at the first link location of the optical link segment,
calculating a second OPPR of the first and second PTs using the powers of the first and second PTs measured at the second link location of the optical link segment,
calculating a difference function of the first and second OPPRs over the period of time T, and
calculating the PDL of the optical link segment based on a comparison of a maximum and a minimum of the difference function of the first and second OPPRs.

4. The PDL-measurement system of claim 3, wherein said controlling the first and second PT detectors to measure powers of the first and second PTs comprises:
controlling the first and second PT detectors to synchronously measure powers of the first and second PTs in the PM optical signal at the first and second link locations at or about the input end and the output end of the optical link segment, respectively.

5. The PDL-measurement system of claim 3, wherein the first and second OPPRs are calculated as:

$$\Delta P_1(t) = 10\log_{10}\frac{P_{1x}(t)}{P_{1y}(t)}$$

$$\Delta P_2(t) = 10\log_{10}\frac{P_{2x}(t)}{P_{2y}(t)}$$

where $\Delta P_1$ (t) and $\Delta P_2$ (t) are the first and second OPPRs, respectively, $P_{1x}$ (t) is the power of the first PT measured at the first link location of the optical link segment, $P_{1y}$ (t) is the power of the second PT measured at the first link location of the optical link segment, $P_{2x}$ (t) is the power of the first PT measured at the second link location of the optical link segment, $P_{2y}$ (t) is the power of the second PT measured at the second link location of the optical link segment, and t represents time;

wherein the difference of the first and second OPPRs is calculated as:

$\Delta P_{21}(t) = \Delta P_1(t) - \Delta P_2(t)$ where $\Delta P_{21}$ (t) is the difference of the first and second OPPRs; and wherein the PDL of the optical link segment is calculated as:

$PDL = 0.5 \times (\Delta P_{21}^{max}(t) - \Delta P_{21}^{min}(t))$ where $P_{21}^{max}$ (t) and $P_{21}^{min}$ (t) are maximum and minimum values of $\Delta P_{21}$ (t).

6. The PDL-measurement system of claim 3, wherein said calculating the PDL of the optical link segment comprises:
calculating the PDL of the optical link segment based on a comparison of a maximum of the second OPPR and a minimum of the first OPPRs.

7. The PDL-measurement system of claim 6, wherein the first and second OPPRs are calculated as:

$$\Delta P_1(t) = 10\log_{10}\frac{P_{1x}(t)}{P_{1y}(t)}$$

$$\Delta P_2(t) = 10\log_{10}\frac{P_{2x}(t)}{P_{2y}(t)}$$

where $\Delta P_1$ (t) and $\Delta P_2$ (t) are the first and second OPPRs, respectively, $P_{1x}$ (t) is the power of the first PT measured at the first link location of the optical link segment, $P_{1y}$ (t) is the power of the second PT measured at the first link location of the optical link segment, $P_{2x}$ (t) is the power of the first PT measured at the second link location of the optical link segment, $P_{2y}$ (t) is the power of the second PT measured at the second link location of the optical link segment, and t represents time; and wherein the PDL of the optical link segment is calculated as:

$$PDL = \Delta P_2^{max}(t) - \Delta P_1^{max}(t)$$

where $\Delta P_1^{max}(t)$ and $\Delta P_2^{max}(t)$ are maximum values of $\Delta P_1(t)$ and $\Delta P_2(t)$, respectively.

* * * * *